United States Patent
Zhang (10) Patent No.: US 12,353,910 B2
(45) Date of Patent: Jul. 8, 2025

(54) METHOD AND APPARATUS FOR DETERMINING HARDWARE USAGE, STORAGE MEDIUM, AND ELECTRONIC DEVICE

(71) Applicant: Horizon Journey (Hangzhou) Artificial Intelligence Technology Co., Ltd., Hangzhou (CN)

(72) Inventor: Guoying Zhang, Hangzhou (CN)

(73) Assignee: Horizon Journey (Hangzhou) Artificial Intelligence Technology Co., Ltd., Hangzhou (CN)

( * ) Notice: Subject to any disclaimer, the term of this patent is extended or adjusted under 35 U.S.C. 154(b) by 521 days.

(21) Appl. No.: 17/543,668

(22) Filed: Dec. 6, 2021

(65) Prior Publication Data

US 2022/0188156 A1 Jun. 16, 2022

(30) Foreign Application Priority Data

Dec. 11, 2020 (CN) .......................... 202011438885.5

(51) Int. Cl.
*G06F 9/48* (2006.01)
*G06F 11/34* (2006.01)

(52) U.S. Cl.
CPC ............ *G06F 9/4881* (2013.01); *G06F 9/485* (2013.01); *G06F 11/3419* (2013.01); *G06F 2209/486* (2013.01); *G06F 2209/508* (2013.01)

(58) Field of Classification Search
CPC .... G06F 9/4881; G06F 9/485; G06F 11/3419; G06F 2209/486; G06F 2201/88; G06F 11/3013; G06F 11/3452; G06F 11/3466
See application file for complete search history.

(56) References Cited

U.S. PATENT DOCUMENTS

| | | | |
|---|---|---|---|
| 2008/0209245 A1 | 8/2008 | Becker et al. | |
| 2018/0032373 A1* | 2/2018 | Chen | G06F 9/5038 |
| 2021/0011759 A1* | 1/2021 | Park | G06F 9/4881 |

FOREIGN PATENT DOCUMENTS

| | | |
|---|---|---|
| CN | 102110043 A | 6/2011 |
| CN | 108196995 A | 6/2018 |
| CN | 108536525 A | 9/2018 |
| CN | 112052081 A | 12/2020 |
| JP | 2015225399 A | 12/2015 |

* cited by examiner

*Primary Examiner* — Sisley N Kim
(74) *Attorney, Agent, or Firm* — Harness, Dickey & Pierce, P.L.C.

(57) ABSTRACT

Disclosed are a method and apparatus for determining hardware usage, storage medium and electronic device. The method includes: determining initial period duration and initial task duration corresponding to current period, and executing at least one task in the current period by a hardware module; receiving a usage invoking request at current time point; determining current task duration corresponding to the current time point based on task duration of tasks executed by the hardware module at the current time point and the initial task duration; determining current period duration based on the initial period duration and a difference between the current time point and a starting time point corresponding to the current period; and determining, based on the current task duration and the current period duration, usage of requested hardware module. Thus, real-time performance of usage determining is improved while accuracy of hardware usage is ensured.

17 Claims, 7 Drawing Sheets

METHOD AND APPARATUS FOR DETERMINING HARDWARE USAGE, STORAGE MEDIUM, AND ELECTRONIC DEVICE

RELATED APPLICATION INFORMATION

This application claims priority to Chinese patent application No. 202011438885.5, filed on Dec. 11, 2020, incorporated herein by reference.

FIELD OF THE INVENTION

The present disclosure relates to hardware performance monitoring technologies, and in particular, to a method and apparatus for determining hardware usage, a storage medium, and an electronic device.

BACKGROUND OF THE INVENTION

An auto-driving system scene and some special system scenes of a vehicle have relatively high requirements on real-time performance of a data processing task. Monitoring of a software system on usage of running hardware determines scheduling of the data processing task by software, and thus the real-time performance of data processing is directly affected. While reasonably distributing processing tasks, accurate utilization assessment plays a vital role in stable and safe operation of an entire system.

SUMMARY OF THE INVENTION

To resolve the foregoing technical problem, the present disclosure is proposed. Embodiments of the present disclosure provide a method and apparatus for determining hardware usage, a storage medium, and an electronic device.

According to a first aspect of the embodiments of the present disclosure, there is provided a method for determining hardware usage, including:
  determining initial period duration and initial task duration corresponding to a current period, and executing at least one task in the current period by means of a hardware module;
  receiving a usage invoking request at a current time point;
  determining current task duration corresponding to the current time point based on task duration of tasks executed by the hardware module at the current time point and the initial task duration;
  determining current period duration corresponding to the current time point based on the initial period duration and a difference between the current time point and a starting time point corresponding to the current period; and
  determining, based on the current task duration and the current period duration, hardware usage of the hardware module that is requested by the usage invoking request.

According to a second aspect of the embodiments of the present disclosure, there is provided an apparatus for determining hardware usage, including:
  an initialization module, configured to determine initial period duration and initial task duration corresponding to a current period, and execute at least one task in the current period by means of a hardware module;
  a request receiving module, configured to receive a usage invoking request at a current time point;
  a task duration determining module, configured to determine current task duration corresponding to the current time point based on task duration of executed tasks of the hardware module at the current time point and the initial task duration;
  a period duration determining module, configured to determine current period duration corresponding to the current time point based on the initial period duration and a difference between the current time point and a starting time point corresponding to the current period; and
  a hardware usage determining module, configured to determine, based on the current task duration and the current period duration, hardware usage of the hardware module that is requested by the usage invoking request.

According to a third aspect of the embodiments of the present disclosure, there is provided a computer-readable storage medium, wherein the storage medium stores a computer program used to implement the method for determining hardware usage according to the first aspect of the embodiments of the present disclosure.

According to a fourth aspect of the embodiments of the present disclosure, there is provided an electronic device, wherein the electronic device includes:
  a processor; and
  a memory configured to store processor-executable instructions,
  wherein the processor is configured to read the executable instructions from the memory, and execute the instructions to implement the method for determining hardware usage according to the first aspect of the embodiments of the present disclosure.

In accordance with the method and apparatus for determining hardware usage, the storage medium, and the electronic device that are provided in the foregoing embodiments of the present disclosure, by means of determining the current period duration in combination with the initial period duration and determining the current task duration in combination with the initial task duration, real-time performance of usage determination is improved while accuracy of the hardware usage is ensured, thereby providing reliable reference for dynamically scheduling hardware to process a task by upper-level software in a real-time manner. Through hardware task scheduling, overload of the hardware module is avoided, and safety and stability of a system using the hardware module are improved.

The technical solutions of the present disclosure are further described in detail below with reference to the accompanying drawings and embodiments.

BRIEF DESCRIPTION OF THE DRAWINGS

By describing the embodiments of the present disclosure more detailed with reference to the accompanying drawings, the foregoing and other objectives, features, and advantages of the present disclosure will become more apparent. The accompanying drawings are used to provide further understanding of the embodiments of the present disclosure, and constitute a part of the specification and are used to explain the present disclosure together with the embodiments of the present disclosure, but they do not constitute limitation to the present disclosure. In the accompanying drawings, the same reference numerals generally represent the same components or steps.

DETAILED DESCRIPTION OF THE EMBODIMENTS

Exemplary embodiments of the present disclosure are described below in detail with reference to the accompanying drawings. Obviously, the described embodiments are merely a part, rather than all of embodiments of the present disclosure. It should be understood that the present disclosure is not limited by the exemplary embodiments described herein.

It should be noted that unless otherwise specified, the scope of the present disclosure is not limited by relative arrangement, numeric expressions, and numerical values of components and steps described in these embodiments.

A person skilled in the art may understand that terms such as "first" and "second" in the embodiments of the present disclosure are merely configured to distinguish different steps, devices, or modules, and indicate neither any particular technical meaning, nor necessarily logical ordering among them.

It should be further understood that, in the embodiments of the present disclosure, the term "multiple/a plurality of" may refer to two or more; and the term "at least one" may refer to one, two, or more.

It should be further understood that, any component, data, or structure involved in the embodiments of the present disclosure may be generally construed to one or more, unless it is clearly stated or the context indicates otherwise.

In addition, the term "and/or" in the present disclosure refers to only an association relationship that describes associated objects, indicating presence of three relationships. For example, A and/or B may indicate presence of three cases: A alone, both A and B, and B alone. In addition, the character "/" in the present disclosure generally indicates an "or" relationship of associated objects.

It should be further understood that, the descriptions of the various embodiments of the present disclosure focus on differences among the various embodiments. The same or similar parts among the embodiments may refer to one another. For concision, description is not repeated.

Meanwhile, it should be understood that, for ease of description, the accompanying drawings are not necessarily to scale in size of any of parts shown therein.

Descriptions of at least one exemplary embodiment below are actually illustrative only, and never serve as any limitation to the present disclosure long with application or use thereof.

Technologies, methods, and devices known by a person of ordinary skills in the related fields may not be discussed in detail herein. However, where appropriate, the technologies, the methods, and the devices shall be regarded as a part of the specification.

It should be noted that, similar signs and letters in the following accompanying drawings indicate similar items. Therefore, once a certain item is defined in one of the accompanying drawings, there is no need to further discuss the item in the subsequent accompanying drawings.

The embodiments of the present disclosure may be applicable to a terminal device, a computer system, a server, and other electronic devices, which may be operated together with numerous other general-purpose or special-purpose computing system environments or configurations. Well-known examples of the terminal device, the computing systems, and environment and/or configuration applicable to be used with the terminal device, the computer system, the server, and other electronic devices include but are not limited to: a personal computer system, a server computer system, a thin client, a thick client, a handheld or laptop device, a microprocessor-based system, a set-top box, a programmable consumer electronic product, a network personal computer, a small computer system, a mainframe computer system, and a distributed cloud computing technology environment including any of the foregoing systems, and the like.

The terminal device, the computer system, the server, and other electronic devices may be described in general context of computer system-executable instructions (such as a program module) executed by the computer system. Generally, the program module may include a routine, a program, a target program, a component, logic, a data structure, and the like that execute particular tasks or implement particular abstract data types. The computer system/server may be implemented in a distributed cloud computing environment. In the distributed cloud computing environment, a task may be executed by a remote processing device linked through a communications network. In the distributed cloud computing environment, the program module may be located on a storage medium of a local or remote computing system including a storage device.

Overview of the Present Disclosure

In a process of implementing the present disclosure, the inventor finds that according to an existing method for determining hardware usage, hardware utilization in a period is usually obtained after a timing period ends. At least the following problem exists in the prior art: hardware usage is not obtained in a timely manner but is obtained in a serious lagging way.

Exemplary System

During use of a hardware module, first, a timing period is set by using a timer, and a sum of hardware processing duration of all processed tasks in the timing period is statistically counted, Subsequently, a ratio of the sum of the duration to elapsed duration of the current timing period is taken as usage of the hardware module in the timing period. The hardware module may be any hardware module that processes a task, for example, an image processing hardware module, a coding/decoding module, and an artificial intelligence (AI) neural network accelerator in a system-on-chip (SOC) chip.

Figure 1:
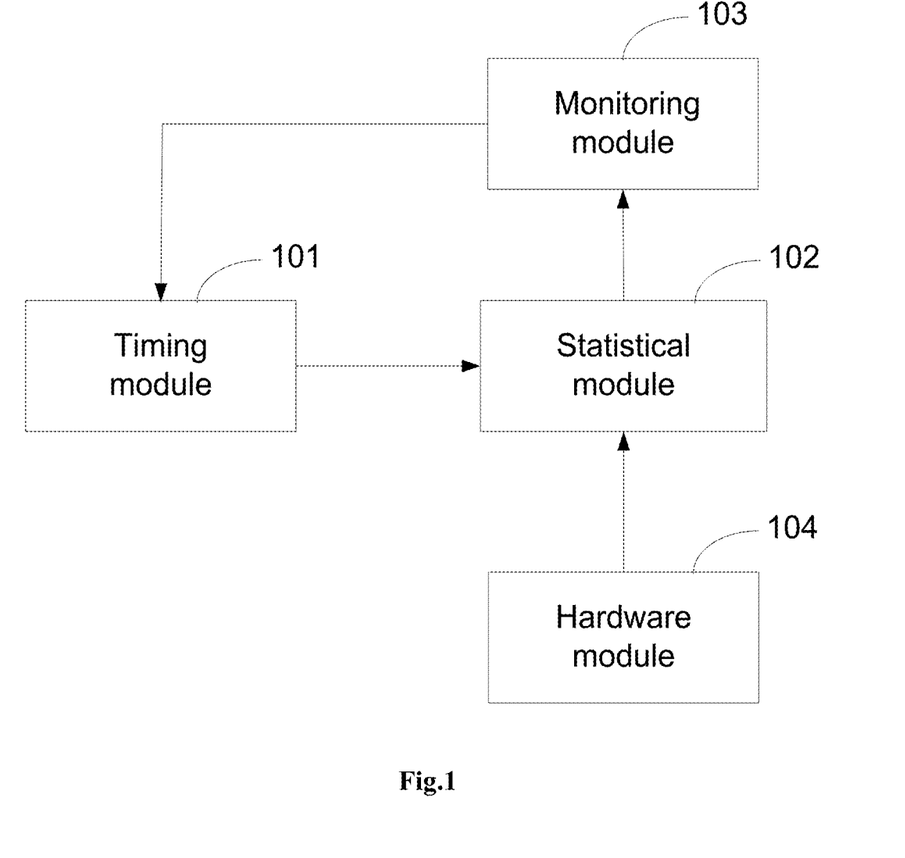
FIG. 1 is a schematic structural diagram of a system for determining hardware usage according to an exemplary embodiment of the present disclosure.

FIG. 1 is a schematic structural diagram of a system for determining hardware usage according to an exemplary embodiment of the present disclosure. The system includes a timing module 101, a statistical module 102, a monitoring module 103, and a hardware module 104.

The timing module 101 is configured to set duration of a timing period, and adjust duration of a next timing period based on a task processing frequency monitored by the monitoring module 103.

The statistical module 102 is configured to obtain time for which the hardware module 104 is used by tasks based on execution of the hardware module 104, and accumulate the time, to obtain hardware usage in a current timing period; and periodically reset the statistical information based on an expiration trigger of the timing period with reference to the duration set by the timing module 101.

The monitoring module 103 monitors a quantity of tasks that is statistically counted by the statistical module 102 in a timing period, and determines the task processing frequency, to provide bases for the timing module 101 to set timing duration.

The hardware module 104 provides bases for the statistical module 102 to obtain processing duration of a single task. A method for providing the basis includes but is not limited to a hardware interruption.

According to the present disclosure, to monitor usage of hardware in a real-time manner, duration of a previous timing period and a sum of all task processing duration in this period are respectively counted into timing duration and task processing duration of a next timing period according to a preset weighted ratio, to serve as a base of a next statistical period. The task processing frequency is synchronously monitored, where the task processing frequency refers to a quantity of tasks processed by the hardware in a timing period. A low task processing frequency indicates fewer tasks processed by the hardware in the timing period; and a high task processing frequency indicates more tasks processed by the hardware in the timing period. When the task processing frequency is relatively low, the duration of a next timing period is shortened; and when the task processing frequency is relatively high, the duration of the next timing period is increased. According to the present disclosure, by means of combing the processing duration and the timing period, the real-time performance of determining the hardware usage is improved while the accuracy of determining the hardware usage is ensured, thereby providing reliable reference for dynamically scheduling the hardware to process a task by upper-level software in a real-time manner, and improving safety and stability of a system using the hardware module.

Exemplary Method

Figure 2:
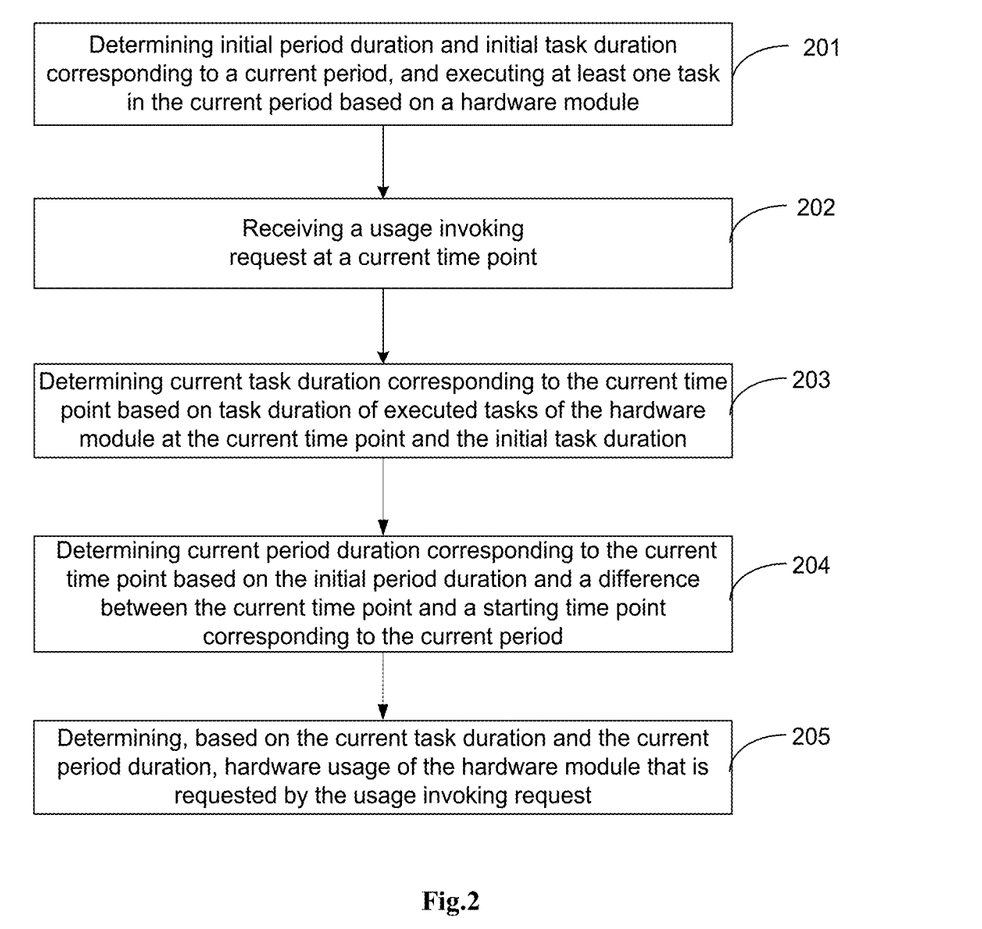
FIG. 2 is a schematic flowchart of a method for determining hardware usage according to an exemplary embodiment of the present disclosure.

FIG. 2 is a schematic flowchart of a method for determining hardware usage according to an exemplary embodiment of the present disclosure. This embodiment may be applied to an electronic device. As shown in FIG. 2, it includes the following steps.

Step 201, determining initial period duration and initial task duration corresponding to a current period, and executing at least one task in the current period by means of a hardware module.

The initial period duration and the initial task duration may be determined based on total duration and total task duration of a previous period before the current period. By increasing the initial period duration and the initial task duration, hardware usage may be arbitrarily obtained in the current period, without a case in which calculation cannot be performed because the current period has started for a short time.

Step 202, receiving a usage invoking request at a current time point.

Usage invoking in this embodiment is fed back based on the usage invoking request sent by a user, and the usage invoking request may be received at any time after the current period starts.

Step 203, determining current task duration corresponding to the current time point based on task duration of tasks executed by the hardware module at the current time point and the initial task duration.

Optionally, duration in which the hardware module executes a task from beginning of the current period to the current time point is taken as the task duration; and the task duration added by the initial task duration is used as the current task duration corresponding to the current time point.

Step 204, determining current period duration corresponding to the current time point based on the initial period duration and a difference between the current time point and a starting time point corresponding to the current period.

In this embodiment, a sum of the initial period duration and the difference between the current time point and the starting time point corresponding to the current period is taken as the current period duration corresponding to the current time point. In other words, a sum of elapsed duration of the current period and the initial period duration is taken as the current period duration.

Step 205, determining, based on the current task duration and the current period duration, hardware usage of the hardware module that is requested by the usage invoking request.

Optionally, a value (which is, for example, expressed as a decimal or a percentage) obtained by dividing the current task duration by the current period duration may be used to indicate the hardware usage of the hardware module at the current time point.

On the basis of the method for determining hardware usage provided in the foregoing embodiment of the present disclosure, by means of determining the current period duration in combination with the initial period duration and determining the current task duration in combination with the initial task duration, real-time performance of usage determination is improved while accuracy of the hardware usage is ensured, thereby providing reliable reference for dynamically scheduling hardware to process a task by upper-level software in a real-time manner. Through hardware task scheduling, overload of the hardware module is avoided, and safety and stability of a system using the hardware module are improved.

Figure 3A:
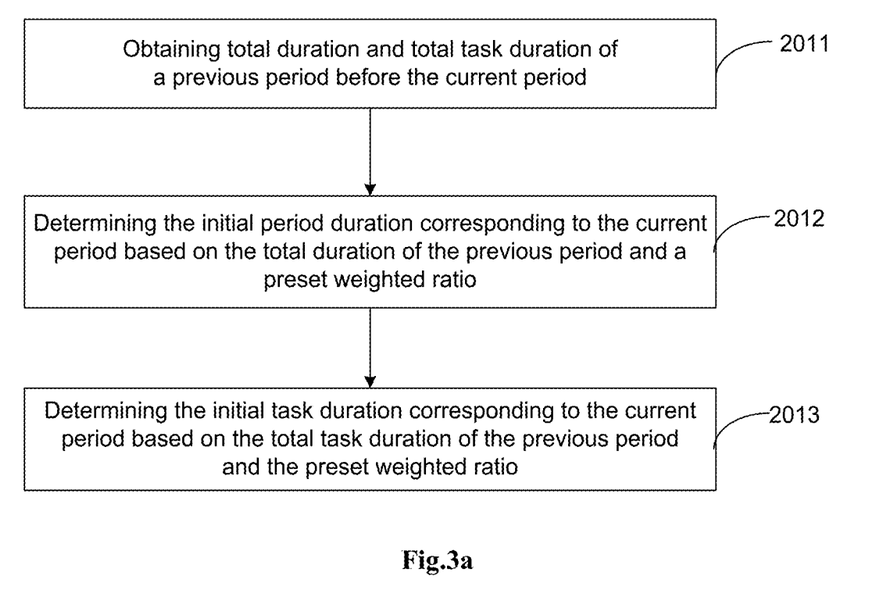
FIG. 3a is a schematic flowchart of step 201 in the embodiment shown in FIG. 2 according to the present disclosure.

As shown in FIG. 3a, on the basis of the foregoing embodiment shown in FIG. 2, step 201 may include the following steps.

Step 2011, obtaining total duration and total task duration of a previous period before the current period.

Figure 3B:
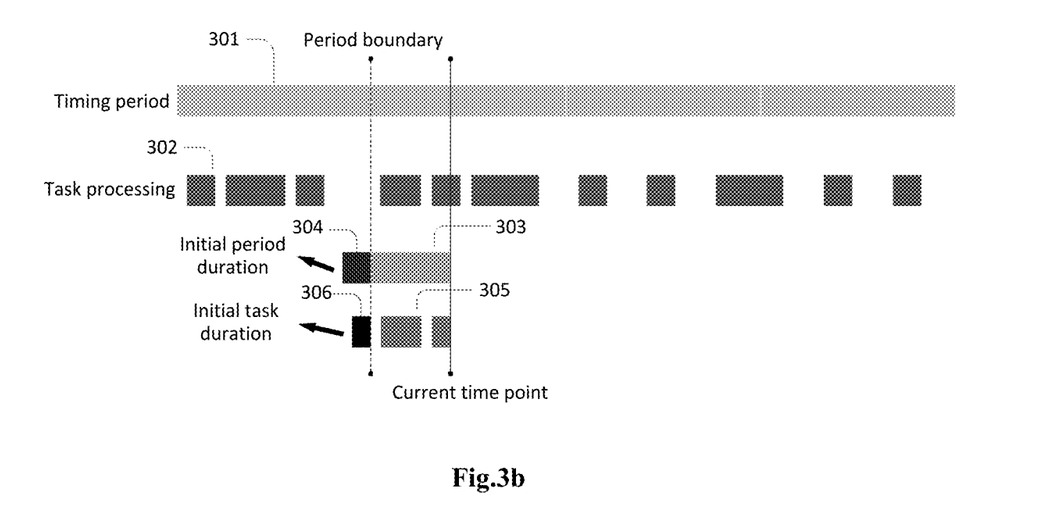
FIG. 3b is a schematic diagram of a task execution period in an example of a method for determining hardware usage according to an exemplary embodiment of the present disclosure.

In an optional example, the hardware module performs task processing according to the timing period shown in FIG. 3b. After a first period boundary, the initial period duration is determined based on total duration 301 of the previous period, and the initial task duration is determined based on total task duration 302 for processing tasks in the previous period.

Step 2012, determining the initial period duration corresponding to the current period based on the total duration of the previous period and a preset weighted ratio.

Optionally, as shown in FIG. 3b, the initial period duration 304 in this embodiment is obtained by multiplying the total duration 301 of the previous period by the preset weighted ratio. The preset weighted ratio may be set according to an actual scenario. For example, the preset weighted ratio is set to 1/64. In this case, the obtained initial period duration 304 is 1/64 of the total duration 301 of the previous period.

Step 2013, determining the initial task duration corresponding to the current period based on the total task duration of the previous period and the preset weighted ratio.

Optionally, as shown in FIG. 3b, the initial task duration 306 in this embodiment is obtained by multiplying the total task duration 302 of the previous period by the preset weighted ratio. The preset weighted ratio may be set according to an actual scenario, for example, to 1/64. In this case, the obtained initial task duration 306 is 1/64 of the total task duration 302 of the previous period.

In this embodiment, as shown in FIG. 3b, if current time is at the vertical solid line, a difference between a current time point corresponding to current hardware and the starting time point corresponding to the current period is represented as 303 in FIG. 3b, and task duration of a task executed by the current hardware at the current time point is represented as 305 in FIG. 3b. In this case, the corresponding current task duration is 305+306, and the current period duration is 303+304. In other words, hardware usage=(305+306)/(303+304).

According to this embodiment, by combining the preset weighted ratio and the processing duration of tasks in a previous timing period and a next timing period, real-time performance of utilization statistics may be achieved, and a smooth transition of the utilization between different periods may be ensured.

Figure 4:
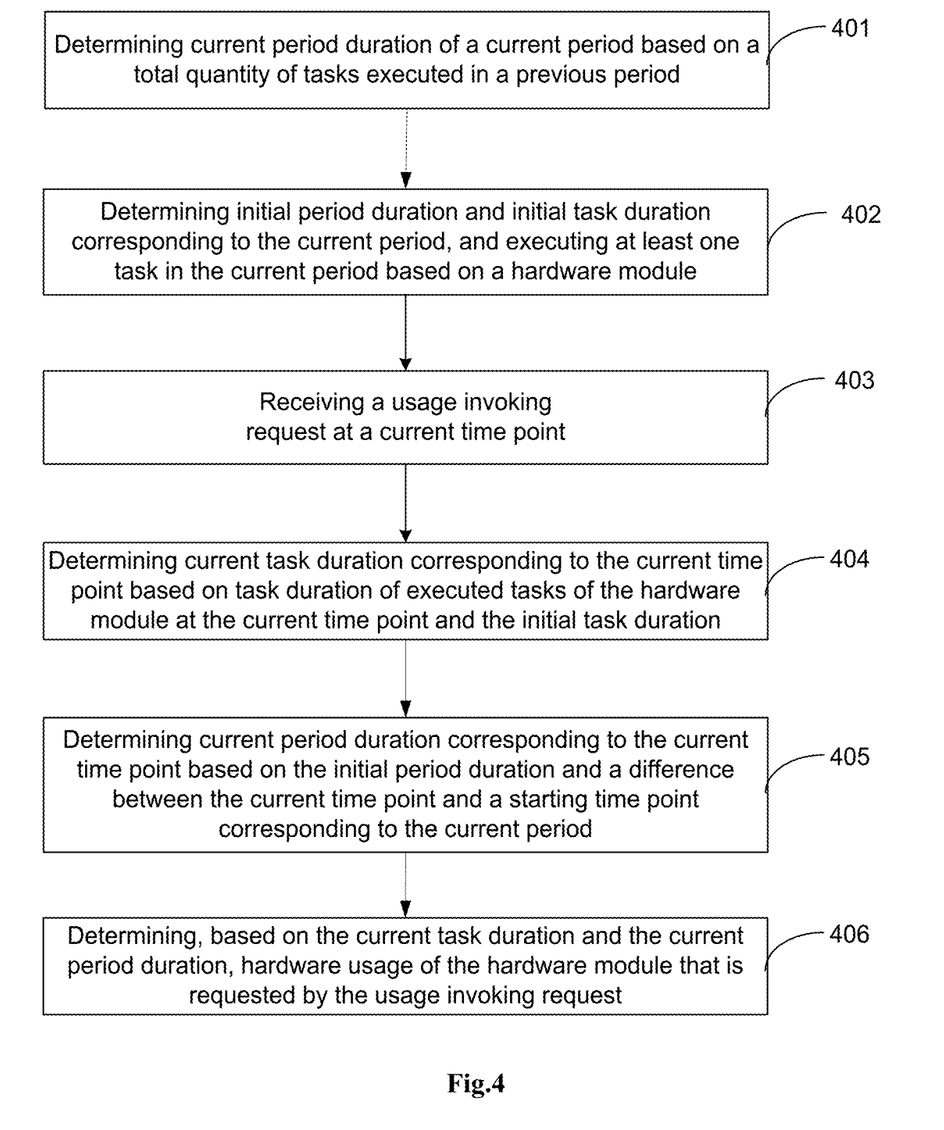
FIG. 4 is a schematic flowchart of a method for determining hardware usage according to another exemplary embodiment of the present disclosure.

FIG. 4 is a schematic flowchart of a method for determining hardware usage according to another exemplary embodiment of the present disclosure. As shown in FIG. 4, the following steps are included.

Step 401, determining current period duration of a current period based on a total quantity of tasks executed in a previous period.

This step may be performed by using the timing module 101 in the foregoing embodiment provided in FIG. 1. The total quantity of the tasks executed in the previous period is obtained based on the task processing frequency determined by the monitoring module 103, and the duration of the current period is determined based on the total quantity.

Step 402, determining initial period duration and initial task duration corresponding to the current period, and executing at least one task in the current period based on a hardware module.

For implementation and effects of this step, reference may be made to step 201 in the foregoing embodiment, and details are not described herein again.

Step 403, receiving a usage invoking request at a current time point.

For implementation and effects of this step, reference may be made to step 202 in the foregoing embodiment, and details are not described herein again.

Step 404, determining current task duration corresponding to the current time point based on task duration of tasks executed by the hardware module at the current time point and the initial task duration.

For implementation and effects of this step, reference may be made to step 203 in the foregoing embodiment, and details are not described herein again.

Step 405, determining current period duration corresponding to the current time point based on the initial period duration and a difference between the current time point and a starting time point corresponding to the current period.

For implementation and effects of this step, reference may be made to step 204 in the foregoing embodiment, and details are not described herein again.

Step 406, determining, based on the current task duration and the current period duration, hardware usage of the hardware module that is requested by the usage invoking request.

For implementation and effects of this step, reference may be made to step 205 in the foregoing embodiment, and details are not described herein again.

In this embodiment, the duration of the current period is adjusted based on the task processing frequency. In this way, task scheduling for the task processing frequency is achieved, thereby avoiding overload of the hardware module, and improving safety and stability of a system using the hardware module.

Figure 5:
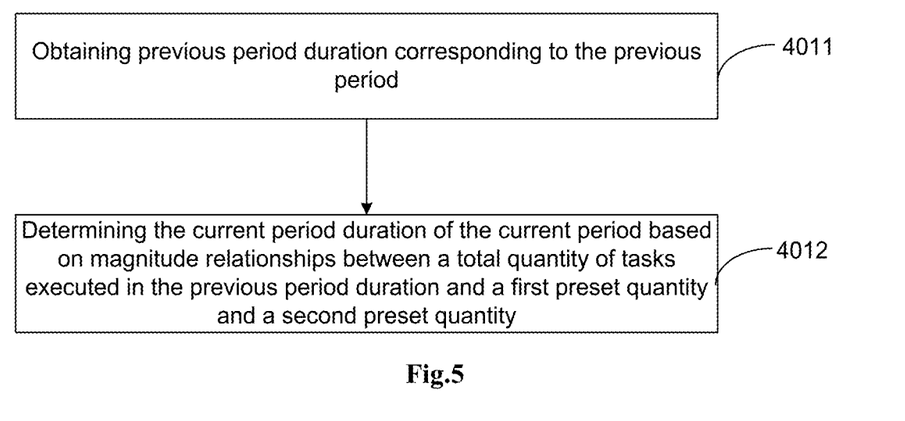
FIG. 5 is a schematic flowchart of step 401 in the embodiment shown in FIG. 4 according to the present disclosure.

As shown in FIG. 5, on the basis of the foregoing embodiment shown in FIG. 4, step 401 may include the following steps.

Step 4011, obtaining previous period duration corresponding to the previous period.

Because the current period duration is obtained by changing the previous period duration, in this embodiment, the previous period duration is first obtained to serve as the basis for the current period duration.

Step 4012, determining the current period duration of the current period based on magnitude relationships between a total quantity of tasks executed in the previous period duration and a first preset quantity and a second preset quantity.

This embodiment may be implemented by using the timing module 101 in the foregoing implementation provided in FIG. 1. A timing process of the timing module 101 may include starting the timing module 101 during a system startup phase. Optionally, there is an initial value, and the initial value may be set according to an actual scenario, for example, to 1 second. An objective of setting the initial value is to make period duration corresponding to the current period not 0 if there is no previous period that has been executed before the current period. A task processing frequency of hardware is obtained from the monitoring module 103. During initialization, because the task processing frequency is not obtained yet, the obtained task processing frequency is 0. Whether to modify the duration of a previous timing period is determined based on the task processing frequency. If the duration of the previous timing period needs to be modified, after the duration of the timing period is modified, the modified duration is taken as duration of a next timing period through the timing module 101. Otherwise, the duration of the previous timing period is taken as the duration of the next timing period through the timing module 101. However, when the current period expires, an expiration trigger may be generated to trigger and notify the statistical module 102 to perform a reset operation of accumulating all task duration, to re-execute all processes in the timing module 101. Period duration of a next period is determined based on the task processing frequency of the current period.

According to this embodiment, the current period duration of the current period is determined based on the total quantity of the tasks executed in the previous period, so that the duration of the current period is more suitable for a task that is being processed by the hardware module. For example, a larger quantity of tasks processed in the previous period indicates that a current task processing frequency is higher. According to this embodiment, the duration of the current period may be adjusted to be longer than that of the previous period. In this way, an overload problem of the hardware module that is caused by processing a large quantity of tasks in a short time is avoided, so that the safety of the hardware module is improved and the service life of the hardware module is prolonged. Specifically, determining the current period duration may include the following three situations:

if the total quantity of the tasks executed in the previous period duration is smaller than or equal to the first preset quantity, the current period duration of the current period is obtained by shortening the previous period duration by first preset duration;

if the total quantity of the tasks executed in the previous period duration is larger than or equal to the second preset quantity, the current period duration of the current period is obtained by increasing the previous period duration by second preset duration; and if the total quantity of the tasks executed in the previous period duration is larger than the first preset quantity and is smaller than the second preset quantity, the previous period duration is taken as the current period duration of the current period.

In this embodiment, the total quantity of the tasks executed in the previous period duration may be determined by accumulating hardware interrupt triggers generated every time when the hardware module completes a task. Every time when a hardware interrupt trigger is received, the quantity of executed tasks is added by one. After an expiration trigger generated when the duration expires is received, accumulation ends, and the total quantity of the tasks executed in the previous period is obtained. The first preset quantity is smaller than the second preset quantity. The duration of the current period is adjusted based on the first preset quantity and the second preset quantity. When the total quantity of the tasks processed in the previous period is smaller than or equal to the first preset quantity, the duration of the current period is made smaller than that of the previous period, thereby improving the usage of the hardware module. When the total quantity of the tasks processed in the previous period is larger than or equal to the second preset quantity, the duration of the current period is made larger than that of the previous period, thereby avoiding an overload problem of the hardware module that is caused by processing excessive tasks in a short time.

Figure 6:
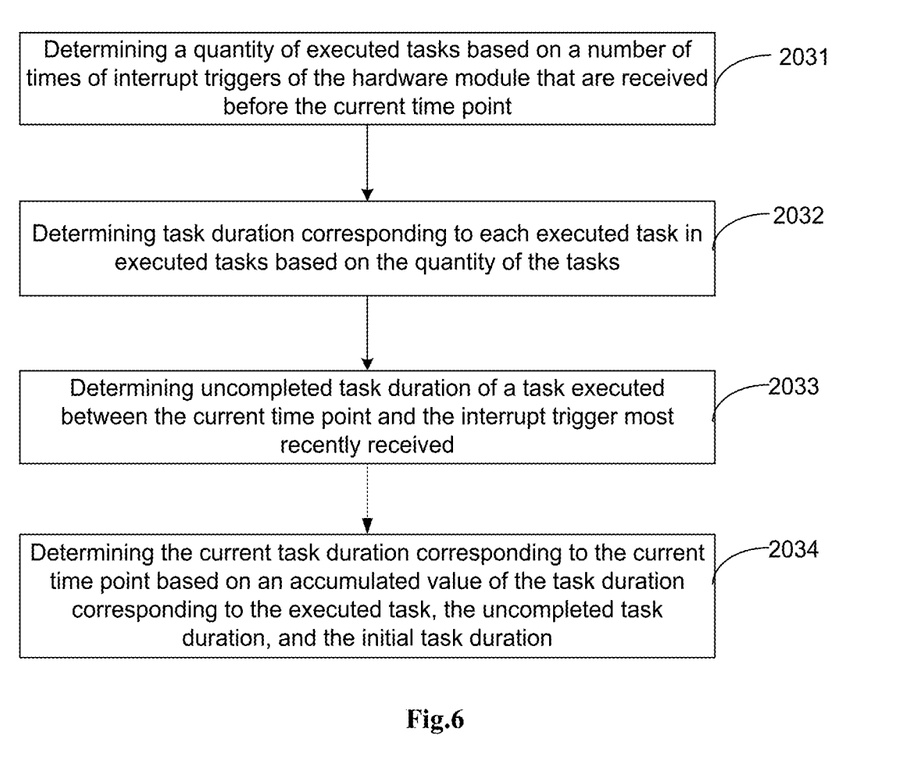
FIG. 6 is a schematic flowchart of step 203 in the embodiment shown in FIG. 2 according to the present disclosure.

As shown in FIG. 6, on the basis of the foregoing embodiment shown in FIG. 2, step 203 may include the following steps.

Step 2031, determining a quantity of executed tasks based on a number of times of interrupt triggers of the hardware module that are received before the current time point.

Each interrupt trigger corresponds to completed execution of a task.

Optionally, the quantity of executed tasks may be 0. In other words, no task is completed by the hardware module at the current time point, and no interrupt trigger is generated. An interrupt trigger may be generated every time when the hardware module completes a task. Optionally, in the embodiment shown in FIG. 1, the statistical module 102 receives the interrupt trigger sent by the hardware module, counts the number of times of the interrupt triggers, and sends a statistical result to the monitoring module 103.

Step 2032, determining task duration corresponding to each executed task in the executed tasks based on the quantity of the tasks.

For example, as shown in the embodiment provided in FIG. 1, after receiving the interrupt trigger sent by the hardware module, the statistical module 102 accumulates task processing duration to total task processing duration, and obtains the task duration corresponding to the executed task corresponding to the current time point. Certainly, when the quantity of executed tasks is 0, the task duration is 0.

Step 2033, determining uncompleted task duration of a task executed between the current time point and the interrupt trigger most recently received.

As shown in FIG. 3b, there is an uncompleted task between the current time point and a previous executed task. In this case, the task is not completed, but has been executed for a period of time. However, the statistical module 102 does not receive the interrupt trigger. The uncompleted task duration may be determined by task execution time after a previous interrupt trigger. Certainly, the uncompleted task duration may also be 0. At this time, there may be two cases: one case is that no task has been executed in the current period; and the other case is that execution of a task has just ended at the current time point in the current period.

Step 2034, determining the current task duration corresponding to the current time point based on an accumulated value of the task duration corresponding to the executed task, the uncompleted task duration, and the initial task duration.

Optionally, a sum of the task duration corresponding to the executed task, the uncompleted task duration, and the initial task duration is taken as the current task duration, so that a value of the current task duration is more accurate.

In this embodiment, a processing status of the hardware can be better reflected through monitoring of the monitoring module on task processing, thereby improving accuracy of occupancy statistics. Moreover, by determining the current task duration in combination with the initial task duration, a problem that the hardware usage cannot be obtained if no task is processed at the beginning of the current period, thereby ensuring a smooth transition of the occupancy between different periods.

Any method for determining hardware usage provided in the embodiments of the present disclosure may be implemented by any suitable device with a data processing capability, including but not limited to a terminal device and a server. Alternatively, any method for determining hardware usage provided in the embodiments of the present disclosure may be implemented by a processor. For example, the processor implements any method for determining hardware usage described in the embodiments of the present disclosure by invoking corresponding instructions stored in a memory. Details are not described herein again.

Exemplary Apparatus

Figure 7:
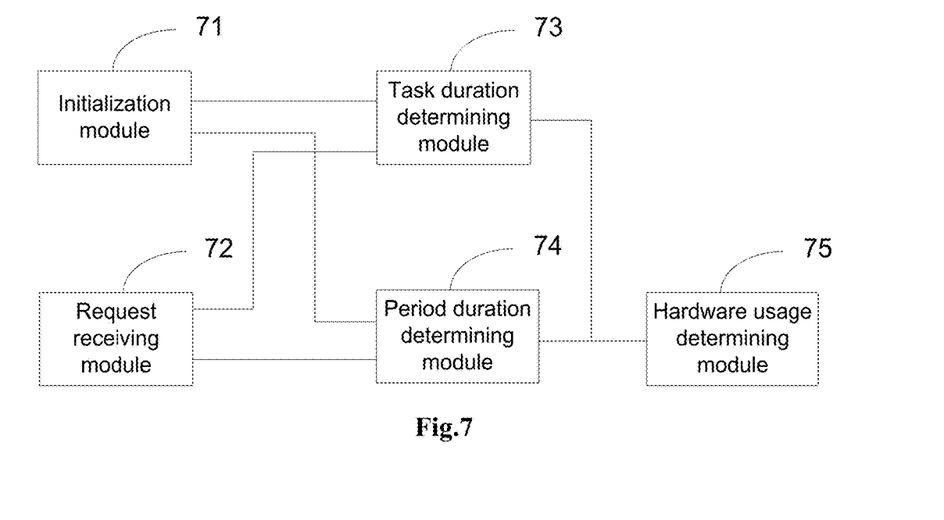
FIG. 7 is a schematic structural diagram of an apparatus for determining hardware usage according to an exemplary embodiment of the present disclosure.

FIG. 7 is a schematic structural diagram of an apparatus for determining hardware usage according to an exemplary embodiment of the present disclosure. As shown in FIG. 7, the apparatus provided in this embodiment includes:

an initialization module 71, configured to determine initial period duration and initial task duration corresponding to a current period, and execute at least one task in the current period by means of a hardware module;

a request receiving module 72, configured to receive a usage invoking request at a current time point;

a task duration determining module 73, configured to determine current task duration corresponding to the current time point based on task duration of tasks executed by the hardware module at the current time point and the initial task duration determined by the initialization module 71;

a period duration determining module 74, configured to determine current period duration corresponding to the current time point based on a difference between the current time point and a starting time point corresponding to the current period and the initial period duration determined by the initialization module 71; and a hardware usage determining module 75, configured to determine, based on the current task duration determined by the task duration determining module 73 and the current period duration determined by the period duration determining module 74, hardware usage of the hardware module that is requested by the usage invoking request.

On the basis of the apparatus for determining hardware usage provided in the foregoing embodiment of the present disclosure, by means of determining the current period duration in combination with the initial period duration and determining the current task duration in combination with the initial task duration, the real-time performance of usage determination is improved while the accuracy of the hardware usage is ensured, thereby providing reliable reference for dynamically scheduling hardware to process a task by upper-level software in a real-time manner. Through hardware task scheduling, the overload of the hardware module is avoided, and the safety and stability of a system using the hardware module are improved.

Figure 8:
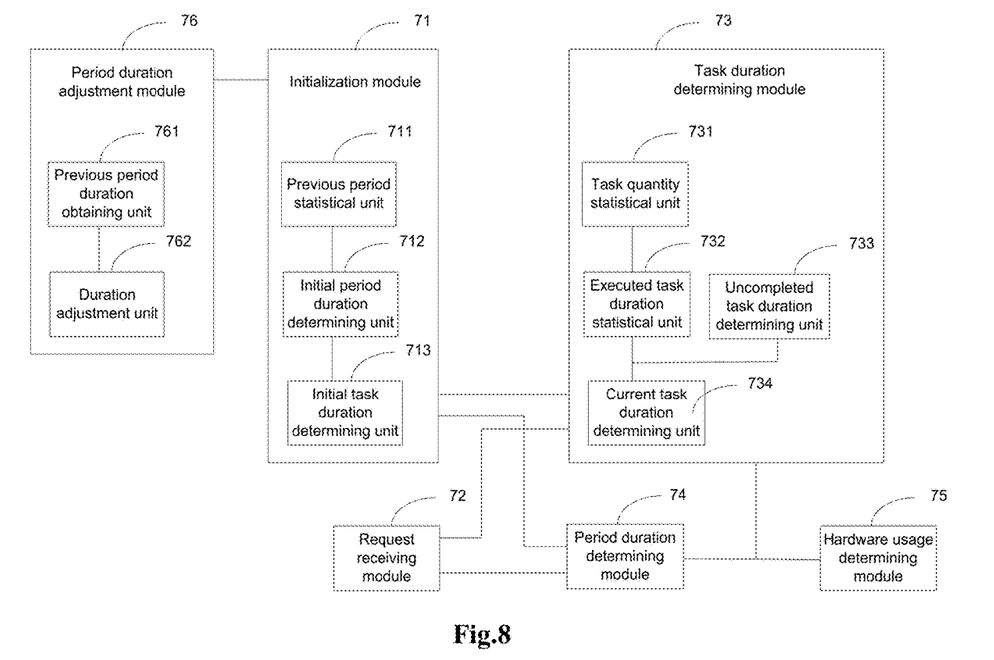
FIG. 8 is a schematic structural diagram of an apparatus for determining hardware usage according to another exemplary embodiment of the present disclosure.

FIG. 8 is a schematic structural diagram of an apparatus for determining hardware usage according to another exemplary embodiment of the present disclosure. As shown in FIG. 8, in the apparatus provided in this embodiment, the initialization module 71 includes:

a previous period statistical unit 711, configured to obtain total duration and total task duration of a previous period before the current period;

an initial period duration determining unit 712, configured to determine the initial period duration corresponding to the current period based on the total duration of the previous period and a preset weighted ratio; and an initial task duration determining unit 713, configured to determine the initial task duration corresponding to the current period based on the total task duration of the previous period and the preset weighted ratio.

In the apparatus provided in this embodiment, the initialization module 71 may further include:

a period duration adjustment module 76, configured to determine current period duration of the current period based on a total quantity of tasks executed in the previous period.

Optionally, the period duration adjustment module 76 includes:

a previous period duration obtaining unit 761, configured to obtain previous period duration corresponding to the previous period; and a duration adjustment unit 762, configured to determine the current period duration of the current period based on magnitude relationships between a total quantity of tasks executed in the previous period duration and a first preset quantity and a second preset quantity.

Optionally, the duration adjustment unit 762 is specifically configured to: obtain the current period duration of the current period by shortening the previous period duration by first preset duration if the total quantity of the tasks executed in the previous period duration is smaller than or equal to the first preset quantity; obtain the current period duration of the current period by increasing the previous period duration by second preset duration if the total quantity of the tasks executed in the previous period duration is larger than or equal to the second preset quantity; and take the previous period duration as the current period duration of the current period if the total quantity of the tasks executed in the previous period duration is larger than the first preset quantity and is smaller than the second preset quantity.

The task duration determining module 73 includes:

a task quantity statistical unit 731, configured to determine a quantity of executed tasks based on a number of times of interrupt triggers of the hardware module that are received before the current time point, wherein each interrupt trigger corresponds to completed execution of a task;

an executed task duration statistical unit 732, configured to determine task duration corresponding to each executed task in the executed tasks based on the quantity of the tasks;

an uncompleted task duration determining unit 733, configured to determine uncompleted task duration of a task executed between the current time point and the interrupt trigger most recently received; and a current task duration determining unit 734, configured to determine the current task duration corresponding to the current time point based on an accumulated value of the task duration corresponding to the executed task, the uncompleted task duration, and the initial task duration.

Exemplary Electronic Device

An electronic device according to an embodiment of the present disclosure is described below with reference to FIG. 9. The electronic device may be any one or two of a first device 100 and a second 200, or a stand-alone device separated from the first device 100 and the second device 200. The stand-alone device may communicate with the first device and the second device, to receive obtained input signals therefrom.

Figure 9:
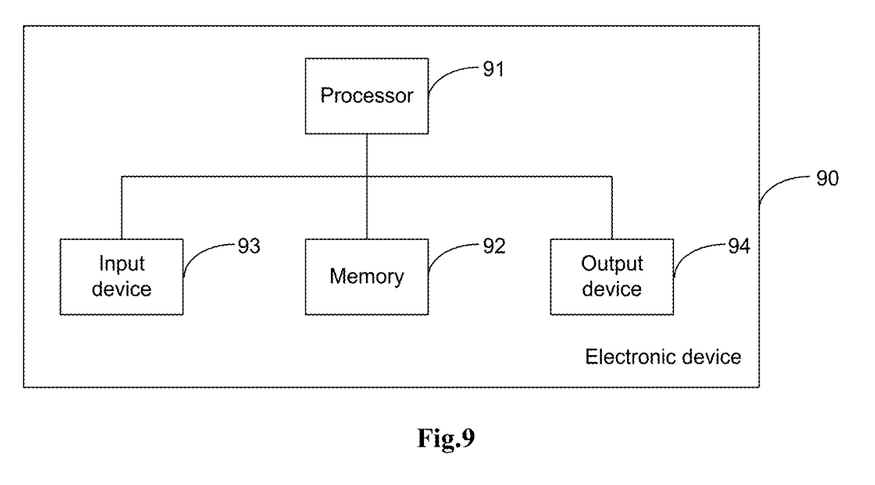
FIG. 9 is a structural diagram of an electronic device according to an exemplary embodiment of the present disclosure.

FIG. 9 is a block diagram of an electronic device according to an embodiment of the present disclosure.

As shown in FIG. 9, an electronic device 90 includes one or more processors 91 and a memory 92.

The processor 91 may be a central processing unit (CPU) or another form of processing unit having a data processing capability and/or an instruction execution capability, and may control other components in the electronic device 90 to perform desired functions.

The memory 92 may include one or more computer program products. The computer program product may include various forms of computer-readable storage media, such as a volatile memory and/or a non-volatile memory.

The volatile memory may include, for example, a random access memory (RAM) and/or a cache. The nonvolatile memory may include, for example, a read-only memory (ROM), a hard disk, and a flash memory. One or more computer program instructions may be stored on the computer-readable storage medium. The program instruction may be executed by the processor 91, to implement the method for determining hardware usage according to the foregoing various embodiments of the present disclosure and/or other desired functions. Various contents such as an input signal, a signal component, and a noise component may also be stored in the computer-readable storage medium.

In an example, the electronic device 90 may further include an input device 93 and an output device 94. These components are connected with each other through a bus system and/or another form of connection mechanism (not shown).

For example, when the electronic device is the first device 100 or the second 200, the input device 93 may be a microphone or a microphone array described above, and is configured to capture an input signal of a sound signal. When the electronic device is a stand-alone device, the input device 93 may be a communication network connector, and is configured to receive the input signals obtained by the first device 100 and the second device 200.

In addition, the input apparatus 93 may further include, for example, a keyboard and a mouse.

The output device 94 may output various information to the outside, including determined distance information, direction information, and the like. The output device 94 may include, for example, a display, a loudspeaker, a printer, a communication network, and a remote output device connected by the communication network.

Certainly, for simplicity, FIG. 9 shows only some of components in the electronic device 90 that are related to the present disclosure, and components such as a bus and an input/output interface are omitted. In addition, according to specific application situations, the electronic device 90 may further include any other appropriate components.

Exemplary Computer Program Product and Computer-Readable Storage Medium

In addition to the foregoing method and device, the embodiments of the present disclosure may further relate to a computer program product, which includes a computer program instruction. When the computer program instruction is executed by a processor, the processor is enabled to perform the steps, of the method for determining hardware usage according to the embodiments of the present disclosure, that are described in the "exemplary method" part of this specification.

The computer program product may be program codes, written with one or any combination of a plurality of programming languages, that are configured to perform the operations in the embodiments of the present disclosure. The programming languages include an object-oriented programming language such as Java or C++, and further include a conventional procedural programming language such as a "C" language or a similar programming language. The program codes may be entirely or partially executed on a user computing device, executed as an independent software package, partially executed on the user computing device and partially executed on a remote computing device, or entirely executed on the remote computing device or a server.

In addition, the embodiments of the present disclosure may further relate to a computer-readable storage medium, which stores computer program instructions. When the computer program instructions are executed by the processor, the processor is enabled to perform the steps, of the method for determining hardware usage according to the embodiments of the present disclosure, that are described in the "exemplary method" part of this specification.

The computer-readable storage medium may be one readable medium or any combination of a plurality of readable media. The readable medium may be a readable signal medium or a readable storage medium. The readable storage medium may include, for example, but is not limited to electricity, magnetism, light, electromagnetism, infrared ray, or a semiconductor system, apparatus or device, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

Basic principles of the present disclosure are described above in combination with the specific embodiments. However, it should be pointed out that the advantages, superiorities, and effects mentioned in the present disclosure are merely examples but are not for limitation, and it cannot be considered that these advantages, superiorities, and effects are necessary for each embodiment of the present disclosure. In addition, specific details of the above disclosure are merely for examples and for ease of understanding, rather than limitations. The foregoing details do not limit that the present disclosure must be implemented by using the foregoing specific details.

The various embodiments in this specification are all described in a progressive way, and each embodiment focuses on a difference from other embodiments. For same or similar parts among the various embodiments, reference may be made to each other. The system embodiments basically correspond to the method embodiments, and thus are relatively simply described. For related parts, reference may be made to a part of the descriptions of the method embodiments.

The block diagrams of the equipment, the apparatus, the device, and the system involved in the present disclosure are merely exemplary examples and are not intended to require or imply that the equipment, the apparatus, the device, and the system must be connected, arranged, and configured in the manners shown in the block diagrams. It is recognized by a person skilled in the art that, the equipment, the apparatus, the device, and the system may be connected, arranged, and configured in an arbitrary manner. Terms such as "include", "contain", and "have" are open terms, refer to "including but not limited to", and may be used interchangeably with "including but not limited to". The terms "or" and "and" used herein refer to the term "and/or", and may be used interchangeably with "and/or", unless the context clearly indicates otherwise. The term "such as" used herein refers to the phrase "such as but not limited to", and may be used interchangeably with "such as but not limited to".

The method and the apparatus in the present disclosure may be implemented in many ways. For example, the method and the apparatus in the present disclosure may be implemented by software, hardware, firmware, or any combination of the software, the hardware, and the firmware.

The foregoing sequence of the steps of the method is for illustration only, and the steps of the method in the present disclosure are not limited to the sequence specifically described above, unless otherwise specifically stated in any other manner. In addition, in some embodiments, the present disclosure may also be implemented as programs recorded in a recording medium. These programs include machine-readable instructions for implementing the method according to the present disclosure. Therefore, the present disclosure further relates to a recording medium storing a program for implementing the method according to the present disclosure.

It should be further pointed out that, various components or various steps in the apparatus, the device, and the method of the present disclosure may be disassembled and/or recombined. These disassembled and/or recombined components or steps shall be regarded as equivalent solutions of the present disclosure.

The foregoing description about the disclosed aspects is provided, so that the present disclosure can be complete or carried out by any person skilled in the art. Various modifications to these aspects are very obvious to a person skilled in the art. Moreover, general principles defined herein may be applicable to other aspects without departing from the scope of the present disclosure. Therefore, the present disclosure is not intended to be limited to the aspect illustrated herein, but to the widest scope consistent with the principles and novel features disclosed herein.

The foregoing description has been given for illustration and description. In addition, this description is not intended to limit the embodiments of the present disclosure to be in forms disclosed herein. Although a plurality of exemplary aspects and embodiments have been discussed above, a person skilled in the art may recognize certain variations, modifications, changes, additions, and sub-combinations thereof.

What is claimed is:

1. A method for determining hardware usage implemented by a processor, including:
    determining initial period duration and initial task duration corresponding to a current period, and executing at least one task in the current period by means of a hardware module;
    receiving a usage invoking request at a current time point;
    determining current task duration corresponding to the current time point based on task duration of tasks executed by the hardware module at the current time point and the initial task duration;
    determining current period duration corresponding to the current time point based on the initial period duration and a difference between the current time point and a starting time point corresponding to the current period; and
    determining, based on the current task duration and the current period duration, hardware usage of the hardware module that is requested by the usage invoking request,
    wherein the determining initial period duration and initial task duration corresponding to a current period includes:
    obtaining total duration and total task duration of a previous period before the current period;
    determining the initial period duration corresponding to the current period based on the total duration of the previous period and a preset weighted ratio; and
    determining the initial task duration corresponding to the current period based on the total task duration of the previous period and the preset weighted ratio.

2. The method according to claim 1, wherein before the determining initial period duration and initial task duration corresponding to a current period, and executing at least one task in the current period based on a hardware module, the method further includes:
    determining current period duration of the current period based on a total quantity of tasks executed in the previous period.

3. The method according to claim 2, wherein the determining current period duration of the current period based on a total quantity of tasks executed in the previous period includes:
    obtaining previous period duration corresponding to the previous period; and
    determining the current period duration of the current period based on magnitude relationships between a total quantity of tasks executed in the previous period duration and a first preset quantity and a second preset quantity.

4. The method according to claim 3, wherein the determining the current period duration of the current period based on magnitude relationships between a total quantity of tasks executed in the previous period duration and a first preset quantity and a second preset quantity includes:
    if the total quantity of the tasks executed in the previous period duration is smaller than or equal to the first preset quantity, obtaining the current period duration of the current period by shortening the previous period duration by first preset duration;
    if the total quantity of the tasks executed in the previous period duration is larger than or equal to the second preset quantity, obtaining the current period duration of the current period by increasing the previous period duration by second preset duration; and
    if the total quantity of the tasks executed in the previous period duration is larger than the first preset quantity and is smaller than the second preset quantity, taking the previous period duration as the current period duration of the current period.

5. The method according to claim 3, wherein if there is no previous period that has been executed before the current period, the current period duration of the current period is set an initial value.

6. The method according to claim 1, wherein the determining current task duration corresponding to the current time point based on task duration of tasks executed by the hardware module at the current time point and the initial task duration includes:
    determining a quantity of executed tasks based on a number of times of interrupt triggers of the hardware module that are received before the current time point, wherein each of the interrupt triggers corresponds to completed execution of a task;
    determining the task duration corresponding to each executed task in the executed tasks based on the quantity of the tasks;
    determining uncompleted task duration of a task executed between the current time point and the interrupt trigger most recently received; and
    determining the current task duration corresponding to the current time point based on an accumulated value of the task duration corresponding to the executed task, the uncompleted task duration, and the initial task duration.

7. A non-transitory computer-readable storage medium, wherein the storage medium stores a computer program used to implement a method for determining hardware usage implemented by a processor including:
- determining initial period duration and initial task duration corresponding to a current period, and executing at least one task in the current period by means of a hardware module;
- receiving a usage invoking request at a current time point;
- determining current task duration corresponding to the current time point based on task duration of tasks executed by the hardware module at the current time point and the initial task duration;
- determining current period duration corresponding to the current time point based on the initial period duration and a difference between the current time point and a starting time point corresponding to the current period; and
- determining, based on the current task duration and the current period duration, hardware usage of the hardware module that is requested by the usage invoking request,
- wherein the determining initial period duration and initial task duration corresponding to a current period includes:
- obtaining total duration and total task duration of a previous period before the current period;
- determining the initial period duration corresponding to the current period based on the total duration of the previous period and a preset weighted ratio; and
- determining the initial task duration corresponding to the current period based on the total task duration of the previous period and the preset weighted ratio.

8. The non-transitory computer-readable storage medium according to claim 7, wherein before the determining initial period duration and initial task duration corresponding to a current period, and executing at least one task in the current period based on a hardware module, the method further includes:
- determining current period duration of the current period based on a total quantity of tasks executed in the previous period.

9. The non-transitory computer-readable storage medium according to claim 8, wherein the determining current period duration of the current period based on a total quantity of tasks executed in the previous period includes:
- obtaining previous period duration corresponding to the previous period; and
- determining the current period duration of the current period based on magnitude relationships between a total quantity of tasks executed in the previous period duration and a first preset quantity and a second preset quantity.

10. The non-transitory computer-readable storage medium according to claim 9, wherein the determining the current period duration of the current period based on magnitude relationships between a total quantity of tasks executed in the previous period duration and a first preset quantity and a second preset quantity includes:
- if the total quantity of the tasks executed in the previous period duration is smaller than or equal to the first preset quantity, obtaining the current period duration of the current period by shortening the previous period duration by first preset duration;
- if the total quantity of the tasks executed in the previous period duration is larger than or equal to the second preset quantity, obtaining the current period duration of the current period by increasing the previous period duration by second preset duration; and
- if the total quantity of the tasks executed in the previous period duration is larger than the first preset quantity and is smaller than the second preset quantity, taking the previous period duration as the current period duration of the current period.

11. The non-transitory computer-readable storage medium according to claim 9, wherein if there is no previous period that has been executed before the current period, the current period duration of the current period is set an initial value.

12. The non-transitory computer-readable storage medium according to claim 7, wherein the determining current task duration corresponding to the current time point based on task duration of tasks executed by the hardware module at the current time point and the initial task duration includes:
- determining a quantity of executed tasks based on a number of times of interrupt triggers of the hardware module that are received before the current time point, wherein each of the interrupt triggers corresponds to completed execution of a task;
- determining the task duration corresponding to each executed task in the executed tasks based on the quantity of the tasks;
- determining uncompleted task duration of a task executed between the current time point and the interrupt trigger most recently received; and
- determining the current task duration corresponding to the current time point based on an accumulated value of the task duration corresponding to the executed task, the uncompleted task duration, and the initial task duration.

13. An electronic device, wherein the electronic device includes:
- a processor; and
- a memory configured to store processor-executable instructions,
- wherein the processor is configured to read the executable instructions from the memory, and execute the instructions to implement a method for determining hardware usage including:
- determining initial period duration and initial task duration corresponding to a current period, and executing at least one task in the current period by means of a hardware module;
- receiving a usage invoking request at a current time point;
- determining current task duration corresponding to the current time point based on task duration of tasks executed by the hardware module at the current time point and the initial task duration;
- determining current period duration corresponding to the current time point based on the initial period duration and a difference between the current time point and a starting time point corresponding to the current period; and
- determining, based on the current task duration and the current period duration, hardware usage of the hardware module that is requested by the usage invoking request,
- wherein the determining initial period duration and initial task duration corresponding to a current period includes:
- obtaining total duration and total task duration of a previous period before the current period;

determining the initial period duration corresponding to the current period based on the total duration of the previous period and a preset weighted ratio; and determining the initial task duration corresponding to the current period based on the total task duration of the previous period and the preset weighted ratio.

14. The electronic device according to claim 13, wherein before the determining initial period duration and initial task duration corresponding to a current period, and executing at least one task in the current period based on a hardware module, the method further includes:

determining current period duration of the current period based on a total quantity of tasks executed in the previous period.

15. The electronic device according to claim 14, wherein the determining current period duration of the current period based on a total quantity of tasks executed in the previous period includes:

obtaining previous period duration corresponding to the previous period; and determining the current period duration of the current period based on magnitude relationships between a total quantity of tasks executed in the previous period duration and a first preset quantity and a second preset quantity, wherein if there is no previous period that has been executed before the current period, the current period duration of the current period is set an initial value.

16. The electronic device according claim 15, wherein the determining the current period duration of the current period based on magnitude relationships between a total quantity of tasks executed in the previous period duration and a first preset quantity and a second preset quantity includes:

if the total quantity of the tasks executed in the previous period duration is smaller than or equal to the first preset quantity, obtaining the current period duration of the current period by shortening the previous period duration by first preset duration;

if the total quantity of the tasks executed in the previous period duration is larger than or equal to the second preset quantity, obtaining the current period duration of the current period by increasing the previous period duration by second preset duration; and if the total quantity of the tasks executed in the previous period duration is larger than the first preset quantity and is smaller than the second preset quantity, taking the previous period duration as the current period duration of the current period.

17. The electronic device according to claim 13, wherein the determining current task duration corresponding to the current time point based on task duration of tasks executed by the hardware module at the current time point and the initial task duration includes:

determining a quantity of executed tasks based on a number of times of interrupt triggers of the hardware module that are received before the current time point, wherein each of the interrupt triggers corresponds to completed execution of a task;

determining the task duration corresponding to each executed task in the executed tasks based on the quantity of the tasks;

determining uncompleted task duration of a task executed between the current time point and the interrupt trigger most recently received; and determining the current task duration corresponding to the current time point based on an accumulated value of the task duration corresponding to the executed task, the uncompleted task duration, and the initial task duration.

* * * * *